United States Patent Office 3,079,633
Patented Mar. 5, 1963

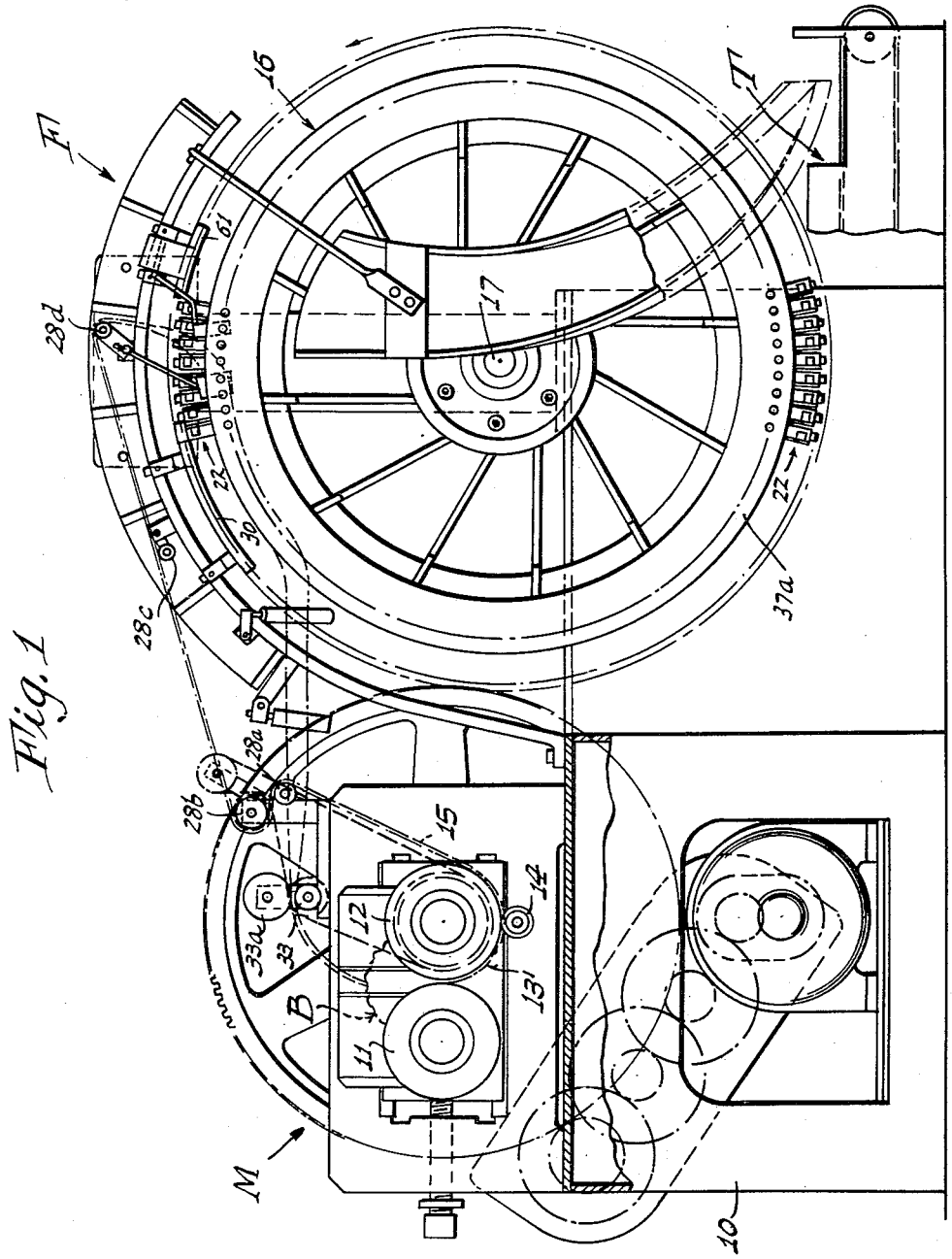

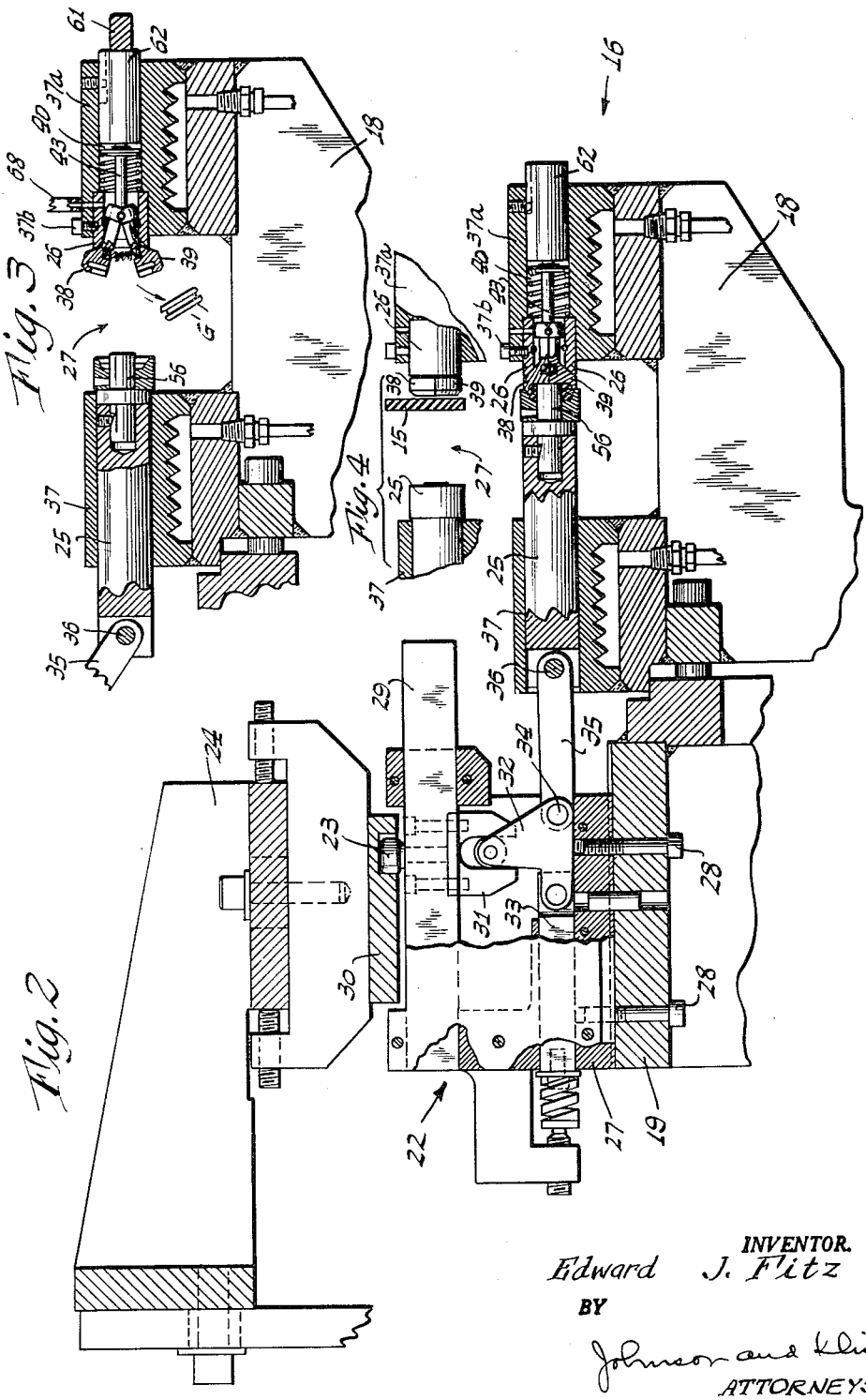

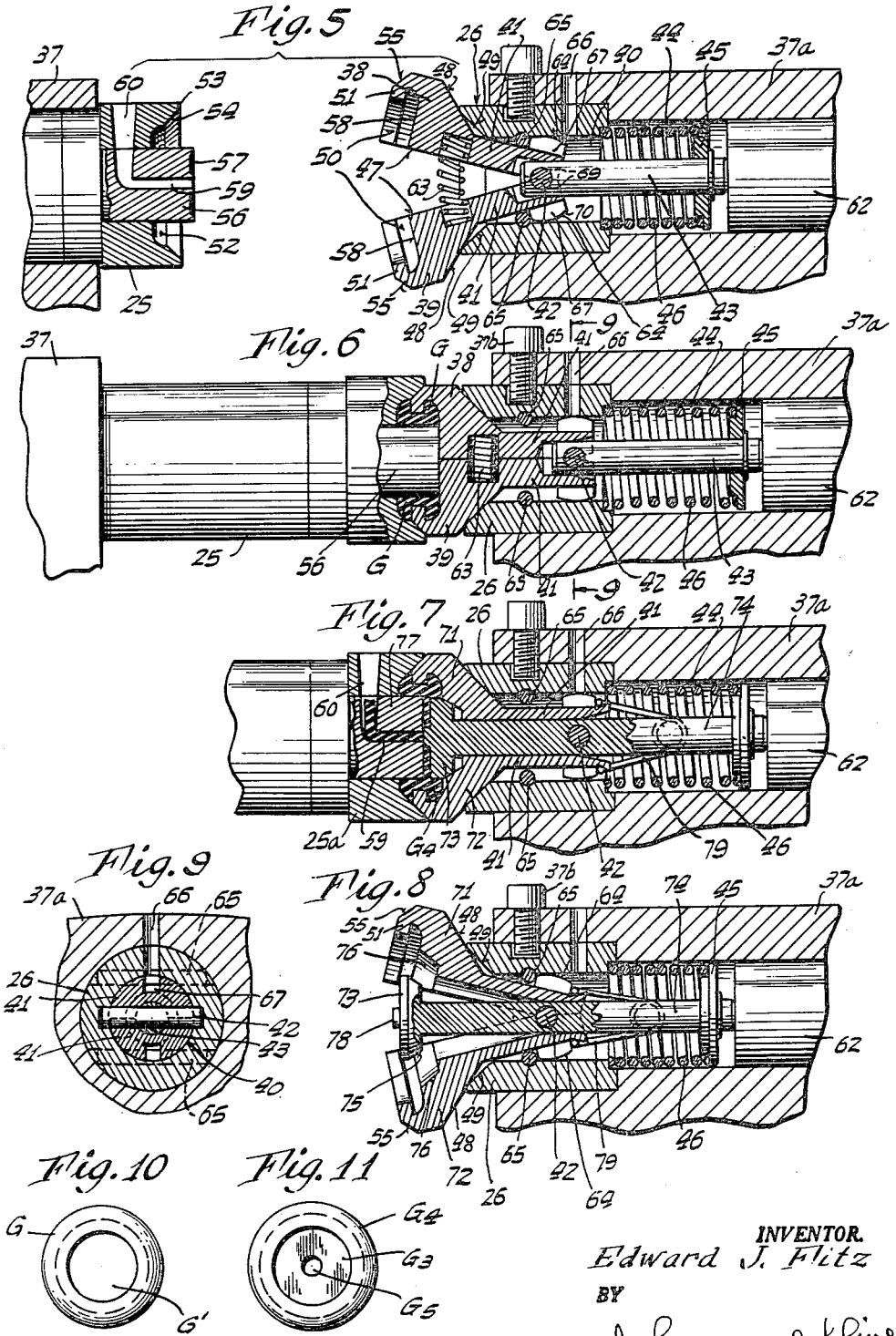

3,079,633
MACHINE AND METHOD FOR MOLDING
HEAT-CURABLE ARTICLES
Edward J. Fitz, Fairfield, Conn., assignor to The Eagle-Picher Company, Cincinnati, Ohio, a corporation of Ohio
Filed Aug. 15, 1960, Ser. No. 49,552
7 Claims. (Cl. 18—5)

This invention relates to methods and apparatus for continuously mass-producing molded articles and particularly such articles which have a plurality of recessed portions extending at substantial angles relative to each other.

An object of this invention is to provide for molding such articles, of which a grommet is an example, in such a way that the articles can be discharged from the molding dies while in semi-cured condition without distorting the articles.

In the use of the methods and apparatus disclosed in the patent to Gora No. 2,943,354, to which the present invention particularly applies, an endless series of pairs of axially aligned cooperating dies close successively upon a ribbon of moldable material and blank therefrom a sufficient quantity of material to fill the cavity formed by the dies and mold the material to form the desired article. After the dies which are heated are closed, they travel in an endless path during which the material becomes semi-cured and at the end of the cycle the dies are opened to discharge the semi-cured article. As disclosed in said patent to Gora, the article can be formed with axially disposed recesses without undercuts, since the article can be discharged from the dies without distorting its shape. However, when the article has recessed portions or deep undercuts extending transversely of the axis of the dies, the stripping of the article from the dies would cause serious distortion of the article unless the curing of the article were carried to a point where the material was substantially stabilized, and this is undesirable since it would greatly increase the time required to complete a cycle of operations in the machine.

Another object of this invention is to provide molding molding dies which are so disposed that a recess may be formed in an article coaxial with the dies and at the same time recesses or undercuts transverse to the axis of the dies can be formed, and yet the semi-cured article can be removed from the dies without distortion of the article. Thus, a grommet having a central aperture and a peripheral groove can be molded by continuous mass-production methods without the grommet being subject to distortion.

The objects of the invention are attained by providing dies which are relatively movable from closed to open positions and which in open position remove the recess-forming elements out of the recess of the semi-cured article.

Other features and advantages will hereinafter appear.

In the accompanying drawings which illustrate several forms of the invention:

FIGURE 1 is a side view of the molding machine embodying this invention, indicating the arrangement of the forming dies in a cyclic path showing the present invention as applied thereto.

FIG. 2 is a longitudinal section showing the forming dies and the core member with control mechanism therefor, the parts being in position to mold and semi-cure a grommet.

FIG. 3 is a fragmentary view of parts of the mechanism shown in FIG. 2, showing the parts in position when the formed article is being discharged.

FIG. 4 is a fragmentary view similar to FIG. 3, showing the parts in the positions which the dies assume when they are about to close upon the strip of moldable material.

FIG. 5 is a longitudinal section of parts of the cooperating dies showing the die with the relatively movable parts in open position which they assume when discharging the molded article.

FIG. 6 is a similar view showing the die parts closed and the article being molded.

FIG. 7 is a view similar to FIG. 6, showing a modified form of the invention.

FIG. 8 is a view of the die members shown in FIG. 7 with the movable parts of the die in open position.

FIG. 9 is a transverse sectional view taken on the line 9—9 of FIG. 6.

FIG. 10 is a view of the grommet shown as being molded in FIG. 6.

FIG. 11 is a view of the grommet as being molded in FIG. 7.

As shown in FIG. 1, the molding machine to which the present invention is applied for illustrative purposes comprises the strip-producing mill M, continuously providing a strip of uncured softened vulcanizable material from which the articles are blanked and formed. The apparatus further comprises the blanking and molding device F to which the strip is supplied continuously to produce the formed articles therefrom. Both the mill unit M and the blanking and molding unit F are shown to be mounted on a common base. The formed articles are discharged from unit F in a semi-cured state in which they are delivered to an oven or other apparatus T in which they are subjected to finish-curing or vulcanizing to acquire the desired permanent set or resiliency of stabilized rubber for instance.

The mill M and the blanking and molding unit F are power-driven in synchronism.

The apparatus comprises a base or frame 10, at one end of which is mounted a pair of mill rollers 11 and 12 which, drawing from a quantity or bank B of moldable material such as uncured rubber or other thermoplastic material forms on the roller 12 an enveloping layer 13 of determinate thickness controlled by the spacing between the rollers of the mill. A rotary cutter 14 removes from the layer 13 a strip 15 of determinate width, the void resulting in the layer 13 being constantly filled by migration of the material from the bank B so that the strip 15 is continuous so long as the bank is maintained by replenishing material and the machine is operated.

Upon the other end of the frame there is mounted a carrier or drum-like structure 16 mounted on a shaft 17 for rotation about a horizontal axis. The carrier or drum 16 has two parts 18 and 19 (see FIG. 2). The part 19 has removably mounted on its periphery a series of actuating units 22 closely spaced and each including a cam follower 23. Secured to the frame 10 and overlying the drum part 19 is an arcuate cam support 24 on which suitable cams are adjustably mounted to be engaged by the follower 23 as the drum rotates.

Mounted on the part 18 of the drum 16 is a series of pairs of coaxially aligned forming dies 25 and 26 which may be separated and brought together and form between them a molding cavity defining the contour of the article to be formed therein. Each pair of the forming dies 25 and 26 constitutes together with their operating unit 22 what is herein termed a molding unit, there being a continuous succession of such units mounted around the drum and traveling therewith in a closed path.

As shown, the die members 25 are mounted to move axially and horizontally toward or away from the die members 26, and each die member 25 is connected to an axially aligned actuating unit 22 by which it is operated when the cam follower 23 reaches and is operated by the cams on the cam support 24 during the rotation of the carrier drum 16. The die member 26, in the embodiment of the invention herein illustrated as exemplary thereof, is mounted so as not to be movable horizontally for molding purposes.

In the open position of the die members 25 and 26 there is a space 27 (see FIGS. 3 and 4) between the die members 25 and 26 and it is into this space that the strip 15 is guided from the mill unit M by guides 28a, 28b, 28c and 28d set at such angles that the horizontally disposed strip is twisted to lie in a vertical plane when entering the space 27 between the die members substantially tangentially to the cyclic path of the molding units. When so located, movement of the die member 25 to cavity-closing position engages the strip 15 and presses it against the die member 26, as shown in FIG. 4, with sufficient force to sever a blank from the strip and to forcibly fill the molding cavity formed by the die members. At the same time the strip 15, which is somewhat wider than the working ends of the two die members 25 and 26, is impaled on the die member which penetrates it and is carried along for a short distance with the drum 16 by the die members. For semi-curing the formed articles, the die members 25 and 26 are heated by conduction or otherwise through their supporting means in any desired manner.

The strip 15 is carried along with the die members only so long as is necessary to control the strip and blank-out the required amount of material. That is to say, the strip is diverted from the cyclic path of the die members as soon as it is practical after the blank to form the article has been cut, preferably after only a few succeeding die members have thus impaled the strip. After blanking, in order to so divert the strip, it is pulled or peeled off the die members tangentially away from their cyclic path, while the die members remain closed.

The skeletonized strip travels back to the bank B on the mill rollers 11 and 12, there to commingle with the material of the bank, the strip being assisted in its return movements as by power-driven feed roller 133 and pressure roller 33a engaging it.

In the precision molding operation of the present machine, the formed blank is left enclosed in the die members for a determined time, so that the formed article therein may continue to be subjected to heating sufficient to cause the molding material to flow and fill the cavity (and to overflow if necessary during its heating up) and thus to become semi-cured to the degree where the article unless forcibly deformed will maintain its shape and size after being discharged from the cavity. Thereafter, the article is subjected to treatment in the oven T to be fully cured or vulcanized. The article may be discharged from the die members 25 and 26 when the die members are opened or separated from each other to receive the work strip 15.

The actuating unit 22 comprises a separate subframe or housing 27, secured by bolts 28 to the part 19 of the drum 16 and in substantial alignment with the axis of the forming dies 25 and 26.

The upper portion of the housing 27 carries a slide bar 29 supporting the cam follower roller 23 for engagement with the cam 30 carried by the cam support 24 mounted on the frame of the machine. The slide bar 29 carries a block 31 having a vertical slot in which rides a roller on a bell crank 32. The bell crank 32 is pivotally carried by a spring backed abutment bar 33 providing the relatively fixed pivot point of the bell crank 32. The bell crank 32 has a pivotal connection 34 with a link 35 pivotally connected at 36 to the die member 25 which reciprocates in a bearing in a flange 37 of the drum part 18. With slide bar 29 in the position shown corresponding to the position of link 35 in FIG. 3 the die member 25 is retracted, but when it is moved by one of the cams 30 to the right, as shown in FIG. 2, the forming die 25 is thereby advanced and the pivotal connections between bar 33, the bell crank 32 and the link 35 are brought into horizontal alignment so that any force tending to push the die member to open position will necessarily have to move the abutment bar 33, since linkage forms a toggle which is locked in the extended or cavity-closing position of the forming die 25. Unlocking of the toggle mechanism is effected by the follower cam roller 23 being engaged by suitable cam surfaces provided on the supporting structure 24.

The part 18 of the molding wheel has spaced from the flange 37 a flange 37a which has a bore carrying the companion die member 26 in axial alignment with the die member 25. The die member 26 is removably locked in the bore by a screw 37b.

The improvements of this invention enable the article-forming device to produce special shapes, grommets for instance, in which there are recesses, undercuts and/or holes disposed at substantial angles relative to each other.

For this purpose, one of the die members 25 or 26 comprises several cavity-forming parts which are mounted to be relatively movable to separate and release the semi-cured article without distorting its intended shape—the other die member completing and closing the article-forming cavity.

In the forms of the invention illustrated, the die member 26 is provided with separable parts while the die member 25 cooperates with these parts to blank the material from the ribbon 15 and complete the molding cavity.

One form of the invention is illustrated in FIGS. 2 to 6 inclusive in which the die member 26 has two movable cavity-forming dies 38 and 39, while in the form of the invention shown in FIG. 7 the die member 26 has three relatively movable dies which will be referred to below.

Referring to the form of the invention illustrated in FIGS. 2 to 6 inclusive, the die member 26 has a central bore 40 into which extend arms 41 carrying the die parts 38 and 39. The arms 41 are pivotally supported on a pin 42 carried by an actuating rod 43 located within the bore 40. The actuating rod 43 also extends into a bore 44 in the flange 37a where it has a head 45 engaged by an expansion spring 46 located between it and the die member 26. The rod 43 and the arms 41 are normally drawn inwardly of the bore, as shown in FIG. 6, at which time the surfaces 47 of the dies 38 and 39 are brought into intimate engagement. This is accomplished by providing cam surfaces 48 on the dies 38 and 39 to cooperate with tapered cam surfaces 49 on the outer end of the die member 26. The die members 38 and 39 together form a cavity 50 of the desired shape of the part of the article to be formed by them and they have inwardly projecting flanges 51, in the form shown, which when the dies 38 and 39 are brought together form an annular ring which will result in producing an annular recess in the article to be molded, a grommet G, as shown in FIG. 6.

When the rod 43 is retracted by the action of the spring 46 and the dies 38 and 39 are in closed position, the dies will have reached a place in their travel with the carrier 16 juxtaposed to the ribbon 15 of moldable material. At this time, the actuating mechanism 22 is operated to move the die member 25 to the right, as shown in FIG. 4, until it engages the ribbon and forces the moldable material into the cavity 50 of the dies 38 and 39 and into a cavity 52 formed in its face. When a projecting edge 53 of the die member 25 has penetrated the molded material, an inclined surface 54 on the die closes on inclined surfaces 55 on the dies 38 and 39 and squeezes the molding material trapped between these surfaces outwardly and at the same time forces the facing surfaces 47 of the dies 38 and 39 into intimate contact. The surfaces 54 and 55 serve as cutoff surfaces to separate the body of the ribbon from the molding material confined in the cavity formed between the dies 38 and 39 and the companion die member 25, the latter being shaped to form the part of the article not formed by the dies 38 and 39.

In addition to having the cavity 52, the die member 25 has a central cylindrical boss 56 which penetrates the molding material and comes to rest with its end 57 engaging faces 58 on the dies 38 and 39 and this boss 56 will cause an aperture (such as the hole G1 in the grommet G shown in FIG. 10) to be formed in the molded article which is in axial alignment with the dies.

To permit the escape of the last of the molding material from between the end 57 of the boss 56 and the surfaces 58, the boss is provided with a longitudinal escape passage 59 communicating with a lateral escape passage 60. Any accumulated surplus material projecting from the passage 60 will be knocked off and is discarded as the drum rotates.

After the dies are closed, as shown in FIG. 6, they continue in their travel until they reach an article-discharging station by which time the articles will have been semi-cured. At this point in the travel of a pair of dies, the dies 38 and 39 are opened. This is accomplished by providing a stationary cam 61 which is in position to engage a push rod 62 located in the bore 44 of the flange 37a and having its inner end in engagement with the end of the actuating rod 43. When the cam 61 moves the push rod 62 inwardly, it in turn moves the other end of the actuating rod 43 outwardly as shown in FIG. 2, causing the dies 38 and 39 to be free for separation. Separation of the dies is accomplished by means of a spring 63 located in cavities in the facing portions of the dies. This can occur as soon as the cam surfaces 48 and 49 disengage.

However, to positively insure the opening of the dies, each of the arms 41 of the dies 38 and 39 is provided with a semicircular flange 64 which, at the end of the movement of the actuating rod 43, engage abutment pins 65 (which pass through the die member as shown in FIG. 9) and positively rock the die members 38 and 39 on their axes to the position shown in FIG. 5.

Before the cam 61 engages the push rod 62, the cam 30 controlling the actuating mechanism 22 will have moved the die member 25 to the left, as shown in FIG. 3. This will result in withdrawing the boss 56 from the central aperture G1 of the piece, the grommet G for instance, leaving the grommet retained by the dies 38 and 39. This operation facilitates the stripping of the boss 56 from the grommet. After the dies 38 and 39 are opened, air under pressure is admitted through an aperture 66 to the bore of the die member 26 through a slot 67, see FIG. 9, and this will cause the grommet to be ejected from the cavities of the dies 38 and 39 if, in fact, it has not been dropped therefrom of its own accord. Air is supplied to the aperture 66 by a shoe 68 (see FIG. 3) connected to a suitable source of compressed air.

It may be noted that the arms 41 have semicircular bearings 69 engaging the pin 42 and that the semicircular flanges 64 have peripheries 70 shaped to engage the walls of the bore 40 to maintain the bearings 69 on the pin 42.

It will be understood, of course, that in practice the dies 38 and 39 will be shaped according to the article to be produced, the forming of the grommet G having been illustrated merely by way of example. Nor is the invention limited to having two relatively movable dies such as the dies 38 and 39.

An example of a multipart die is, for instance, shown in FIGS. 7 and 8 in which there are three relatively movable dies which with the companion die are utilized to make a different form of grommet. As shown in FIGS. 7 and 8, in addition to the pivoted dies 71 and 72 which are mounted and actuated like the dies 38 and 39, with one exception explained below, part of the molding cavity is formed by a die 73 which in this case is carried by the end of a rod 74 which otherwise is like rod 43 shown in FIGS. 5 and 6.

In FIGS. 7 and 8, the parts which are duplicates of the parts shown in FIGS. 5 and 6 have the same reference numerals.

The die 73 is circular and has on its inner side a tapered surface 75 and the dies 71 and 72 have recesses 76 to receive the tapered surface 75 when the dies are closed as shown in FIG. 7. When in this position the forward end of the die 73 projects beyond the contacting surfaces of the dies 71 and 72 so as to form a circular recess in the molded article.

In this form of the invention as shown in FIG. 7, the companion die 25a has a projecting boss 77 which is like the boss 57 shown in FIG. 5 but is shorter so that it does not engage for the entire facing portions of the dies 71, 72 and 73 with the result that when the dies are brought together as shown in FIG. 3, a wall G3 is formed in the grommet G4, see FIGS. 7 and 11.

Thus it will be seen that in this form of the invention recesses are formed in both sides of the article leaving a diaphragm-like wall connecting the main portions of the article. The tapered surface 75 and the tapered entrance to the recess 76 act as a cutoff for the molding material and prevent malformation of the article.

In addition to forming the recess G3 in the article, the die 73 also forms a hole G5. For this purpose, a short boss 78 is formed on the face of the die 73 and this contacts the opposing face of the die member 25a as shown in FIG. 5.

The die member 25a has the axial hole 59 communicating with the exit hole 60 to permit the last of the molding material trapped between the bosses 77 and 78 to escape.

It will be noted that in the form of the invention shown in FIGS. 7 and 8, the spring 63 is omitted and in its place there is a wire hairpin-like spring 79 whose ends engage in recesses in the inner ends of the arms 41 tending to force the ends together which results in opening movement of the dies 71 and 72. However, in the form of the invention shown in FIGS. 7 and 8, since the spring 79 engages the arms 41 at the sides opposite the cooperating cam surfaces 48 and 49 it adds its power to the arms 41 to keep the arms with their bearing surfaces 69 in engagement with the pivot pin 42. It will be noted by those skilled in the art that the hairpin-type spring 79 may advantageously be used in the form of the invention shown in FIGS. 5 and 6 in place of or in addition to the spring 63.

Since the die 73 is interposed between the dies 71 and 72 and the boss 78 is projecting through the wall G3, when the dies 71 and 72 part, they will be readily stripped from the molded piece which will be retained on the boss 78 against lateral movement. The boss 78 being relatively short and the wall G3 being relatively thin, it will require very little effort to dislodge the molded piece from the die 73 and permit its escape from the die.

Variations and modifications may be made within the scope of the claims and portions of the improvements may be used without others.

I claim:

1. Apparatus for compression molding articles of thermo plastic material including a pair of axially aligned die members, one of which is movable axially relative to the other, one of said die members carrying a plurality of molding dies relatively movable from closed molding position to open article-discharging position, said plurality of molding dies comprising a pair of hinged dies shaped to form when closed an open cavity recessed transversely to the axis of the die members; closing means for moving said pair of molding dies to closed position; a companion cavity-closing die on the other die member; cooperating inclined cut-off surfaces on said pair of dies and said companion die; means for moving said die members together on a strip of molding material to bring said cut-off surfaces together to blank a portion of said material therefrom and fill the cavity formed by said pair of molding dies and said companion die member with said moldable material to mold the article; means for separating said companion die and said pair of molding dies leaving the molded article trapped in said pair of molding dies; and means for separating said plurality of molding dies to permit the escape therefrom of the molded article, after which the dies of the pair are moved to closed position by said closing means, the inclined cut-off surfaces of the companion die overlapping the inclined cut-off surfaces of the pair of dies to force the latter tightly in closed position and hold them thus against the tendency of the molding material under compression in the cavity to part the molding dies.

2. Apparatus for compression molding articles of thermoplastic material as defined in claim 1, in which the companion die has an axially disposed core member extending into and toward the bottom of the cavity formed by the pair of hinged dies to form an axial recess in the article being molded.

3. Apparatus for compression molding articles of thermoplastic material as defined in claim 1, in which the companion die has an axial core member extending into and to the bottom of the cavity formed by the pair of hinged dies to engage cooperating surfaces on the latter whereby a hole is formed clear through the article being molded.

4. Apparatus for compression molding articles of thermoplastic material as defined in claim 1, in which said plurality of dies includes a third die mounted axially of the die members and having a portion projecting into the cavity formed by said pair of hinged dies to form an axial recess in the article being molded.

5. Apparatus for compression molding articles of thermoplastic material as defined in claim 1, in which the companion die has a core member extending into and toward the bottom of the cavity formed by the pair of hinged dies to form an axial recess in one side of the article being molded, and in which the said plurality of dies includes a third die mounted axially of the die members and having a portion projecting into the cavity formed by said pair of hinged dies to form an axial recess in the other side of the article being molded.

6. Apparatus for compression molding articles of thermoplastic material as defined in claim 1, in which the hinged dies are mounted in a sleeve carried by its die member for sliding movement in said sleeve and said sleeve and hinged dies have companion inclined surfaces whereby when the hinged dies are drawn into the sleeve they are cammed into closed cavity-forming position.

7. Apparatus for compression molding articles of thermoplastic material as defined in claim 1, in which said plurality of dies includes a third die mounted axially of the die members and having a portion projecting into the cavity formed by said pair of hinged dies to form an axial recess in the article being molded and there are means for moving the third die outwardly of the cavity formed by said hinged dies to eject the molded article therefrom.

References Cited in the file of this patent

UNITED STATES PATENTS

| | | |
|---|---|---|
| 1,349,122 | Edlund | Aug. 10, 1920 |
| 2,327,665 | Peat | Aug. 24, 1943 |
| 2,367,962 | Reibold et al. | Jan. 23, 1945 |
| 2,529,091 | Lester | Nov. 7, 1950 |
| 2,864,123 | Gora | Dec. 16, 1958 |
| 2,891,283 | Cramer et al. | June 23, 1959 |
| 2,894,287 | Zeigle | July 14, 1959 |
| 2,943,354 | Gora | July 5, 1960 |